UNITED STATES PATENT OFFICE.

ALLAN TWISTLETON HALL, OF WILLERBY, ENGLAND.

PAINT.

SPECIFICATION forming part of Letters Patent No. 597,770, dated January 25, 1898.

Application filed June 5, 1897. Serial No. 639,505. (No specimens.) Patented in England December 3, 1895, No. 23,155.

*To all whom it may concern:*

Be it known that I, ALLAN TWISTLETON HALL, a subject of the Queen of Great Britain, residing at Ivy Cottage, Willerby, near Hull, in the county of York, England, have invented certain new and useful Improvements in Paints, (for which I have received Letters Patent in Great Britain, No. 23,155, dated December 3, 1895,) of which the following is a specification.

According to this invention carbonate of lime or other pigment, glue, (either solid or in the form of size,) linseed-oil, and oak-varnish, with or without glycerin, are heated with a suitable amount of water and mixed with a disinfectant, such as carbolic acid or cresylic acid. The mixture is then boiled and the linseed-oil and the oak-varnish therein are oxidized either by a blast of air or by the addition of permanganate of potash, chromic acid, or other oxidizing agent. A coloring material—such as chromate of lead or zinc, vermilion, ultramarine, or oxid of iron—may be added. The mass being thoroughly incorporated is run into molds and is preferably put on the market in the state of pulp.

The following is an example of a color-wash or distemper-paint made in accordance with this invention: one-half pound glue, two pounds raw linseed-oil, one-fourth pound oak-varnish, one-fourth pound glycerin, six pounds water, one ounce cresylic acid, one-fourth pound bichromate of potash, four ounces oxid of iron, ten pounds paris-white, four pounds lithofone.

The oak-varnish referred to is usually composed of kauri, manila, or copal gum melted in linseed-oil and thinned with turpentine, suitable driers being added. Lithofone is the white pigment obtained by precipitating a solution of sulfid of barium with another of sulfate of zinc, resulting in a mixture of precipitated sulfate of barytes and sulfid of zinc.

What I claim is—

1. The process herein described, which consists in mixing and heating together pigment, glue, linseed-oil and oak-varnish and then oxidizing the oil and varnish in said mixture.

2. The process herein described, which consists in mixing and heating together pigment, glue, linseed-oil, glycerin and oak-varnish, and then oxidizing the oil and varnish in said mixture.

3. The process herein described which consists in mixing and heating together pigment, glue, linseed-oil, a disinfectant and oak-varnish, and then oxidizing the oil and varnish in said mixture.

4. The process herein described which consists in mixing and heating together pigment, glue, linseed-oil, glycerin, a disinfectant and oak-varnish, and then oxidizing the oil and varnish in said mixture.

5. The paint herein described consisting of a mixture of pigment, glue, and oxidized linseed-oil and oxidized oak-varnish.

6. The paint herein described consisting of a mixture of pigment, glue, oxidized linseed-oil, glycerin and oxidized oak-varnish.

7. The paint herein described consisting of a mixture of pigment, glue, oxidized linseed-oil, a disinfectant and oxidized oak-varnish.

8. The paint herein described, consisting of a mixture of pigment, glue, oxidized linseed-oil, glycerin, a disinfectant and oxidized oak-varnish.

ALLAN TWISTLETON HALL.

Witnesses:
  THOS. MARRIOTT,
  DAVID W. SISSONS.